United States Patent [19]

Coleman

[11] 4,235,284
[45] Nov. 25, 1980

[54] HEAT EXCHANGER WITH AUXILIARY COOLING SYSTEM

[75] Inventor: John H. Coleman, Salem Township, Westmoreland County, Pa.

[73] Assignee: The United States of America as represented by the United States Department of Energy, Washington, D.C.

[21] Appl. No.: 751,430

[22] Filed: Dec. 16, 1976

[51] Int. Cl.² .............................................. F28F 9/00
[52] U.S. Cl. ................................... 165/141; 165/158; 176/38
[58] Field of Search .................... 176/38, 65; 165/145, 165/158–161, 105, 113, 140, 141, 139; 122/32, 34

[56] References Cited

U.S. PATENT DOCUMENTS

| | | | |
|---|---|---|---|
| 2,894,729 | 7/1959 | Warner | 165/113 |
| 3,164,133 | 1/1965 | Pacault et al. | 122/34 |
| 3,205,146 | 9/1965 | Hackney et al. | 176/38 |
| 3,830,695 | 8/1974 | Sauvage | 176/65 |
| 3,854,528 | 12/1974 | Pouderoux | 165/158 |
| 3,920,514 | 11/1975 | Calvin | 176/38 |
| 3,981,770 | 9/1976 | Middleton | 176/65 |

Primary Examiner—Samuel Scott
Assistant Examiner—Theophil W. Streule, Jr.
Attorney, Agent, or Firm—James E. Denny; Richard G. Besha; C. L. McHale

[57] ABSTRACT

A heat exchanger with an auxiliary cooling system capable of cooling a nuclear reactor should the normal cooling mechanism become inoperable. A cooling coil is disposed around vertical heat transfer tubes that carry secondary coolant therethrough and is located in a downward flow of primary coolant that passes in heat transfer relationship with both the cooling coil and the vertical heat transfer tubes. A third coolant is pumped through the cooling coil which absorbs heat from the primary coolant which increases the downward flow of the primary coolant thereby increasing the natural circulation of the primary coolant through the nuclear reactor.

2 Claims, 3 Drawing Figures

HEAT EXCHANGER WITH AUXILIARY COOLING SYSTEM

GOVERNMENT CONTRACT

The invention described herein was made in the course of, or under, Contract Number E(04-3)1141 with the United States Energy Research and Development Administration.

BACKGROUND OF THE INVENTION

The invention relates to heat exchangers and more particularly to heat exchangers with auxiliary cooling systems.

In nuclear steam supply systems well known in the art, a reactor vessel contains fuel assemblies comprising fuel elements with nuclear fuel therein which produce heat in a commonly understood fashion. A primary coolant, which in fast breeder reactors may be liquid sodium, is circulated through the reactor vessel in heat transfer relationship with the fuel assemblies therein transferring heat from the fuel assemblies to the primary coolant. The primary coolant may then be conducted by a piping network to a heat exchanger and back to the reactor vessel tracing a path that is generally referred to as a primary loop. While passing through the heat exchanger, the primary coolant transfers heat to a secondary coolant which may be liquid sodium. The secondary coolant may then be conducted to a steam generator that produces steam in a manner well known to those skilled in the art. The path traced by such a secondary coolant is generally referred to as a secondary loop. The secondary loop is interposed between the primary loop and the steam production phase in order to isolate the primary coolant which is radioactive from the steam production phase. In many commonly known nuclear steam supply systems, there are three primary loops disposed symmetrically with respect to the reactor vessel each having a coolant pump disposed therein to pump the primary coolant through each primary loop.

During reactor operation, the three coolant pumps simultaneously pump primary coolant into the reactor vessel where the three primary coolant streams intermingle and pass in heat transfer relationship with the fuel assemblies. From this common pool of primary coolant, the primary coolant exits the reactor vessel, flows through the piping network, through the heat exchangers, where heat is transferred from the primary coolant to the secondary coolant, and back to the reactor vessel thus cooling the nuclear reactor. It is now well understood that a nuclear reactor generates a tremendous amount of heat. While the coolant pumps are capable of pumping primary coolant through the reactor vessel in sufficient volume to cool the reactor, auxiliary cooling systems are provided to cool the reactor should the normal heat removal systems not be operable.

One such auxiliary cooling system is one used in conjunction with the heat exchanger disposed between the primary and secondary loops of a liquid metal cooled fast breeder reactor. In that concept, a cylindrical housing defines within it, an inner annulus wherein vertical heat transfer tubes are diposed. An outer housing disposed around the cylindrical housing defines therebetween an inlet annulus that is in fluid communication with the inner annulus. An auxiliary cooling coil is disposed in the inlet annulus and carries a third coolant. A coolant pump pumps primary coolant into the inlet annulus where it flows upwardly across the auxiliary cooling coil and enters the inner annulus through openings near the top of the heat exchanger. After entering the inner annulus, the primary coolant flows downwardly through the inner annulus and in heat transfer relationship with the heat transfer tubes in the inner annulus. In this manner, heat is transferred from the primary coolant to the secondary coolant thus providing a mechanism for cooling the reactor. In this concept should the coolant pump that pumps the primary coolant fail, an auxiliary pump is activated to pump the primary coolant. However, this auxiliary pump is small or itself may not be operable which may thereby limit the flow of primary coolant. In this prior art concept should, for whatever reason, the primary or secondary coolant flow become minimal a third pump is activated that pumps a cool third coolant through the auxiliary cooling coil. The primary coolant in the inlet annulus flowing upwardly across the auxiliary cooling coil thereby transfers heat to the third coolant. This concept thus provides an auxiliary system for cooling the primary coolant which in turn cools the nuclear reactor. There is, however, a disadvantage to this concept. When the primary coolant in contact with the cooling coil in the inlet annulus is cooled, it may begin to flow downwardly in a reverse manner in the inlet annulus due to the natural circulatory effect. This downward-reverse flow of primary coolant has the effect to limit the flow of primary coolant through the primary loop. This presents a particularly acute problem, because the auxiliary cooling system is intended to be utilized when there is a minimal flow of primary coolant through the primary loop. Thus the effectiveness of such an auxiliary cooling system may be limited by this reverse flow characteristic.

In U.S. Pat. No. 1,311,336 to J. O. Frazier, issued July 29, 1919, there is described a by-pass flue gas cane juice heater wherein hot flue gases are diverted by a damper through a by-pass duct passing in heat transfer relationship with tubes carrying cane juice, thereby heating the cane juice. Also, the damper may be automatically closed to avoid overheating the cane juice. While the Frazier patent describes one arrangement for avoiding overheating of cane juice, it does so by mechanically not diverting and thus minimizing flow rather than by increasing flow of a coolant by means of natural circulation.

SUMMARY OF THE INVENTION

A heat exchanger with an auxiliary cooling system capable of cooling a nuclear reactor should the normal cooling mechanism become inoperable. A cooling coil is disposed around a vertically arranged array of heat transfer tubes which are enclosed by a cylindrical wall with openings near the top end of the cylindrical wall. An inlet shroud is disposed around the cylindrical wall defining therebetween an inlet annulus. The primary coolant that has passed through the reactor vessel, enters the inlet annulus, flows upwardly towards the top end of the cylindrical wall and through the openings therein, and then flows downwardly in heat transfer relationship with the heat transfer tubes and the cooling coil thereby transferring heat from the primary coolant to the secondary coolant flowing in the heat transfer tubes. When necessary, a third coolant is pumped through the cooling coil absorbing heat from the primary coolant and cooling the primary coolant thereby increasing the downward natural circulatory flow of the primary coolant thus increasing the cooling flow of primary coolant through the reactor vessel.

It is an object of this invention to provide a heat exchanger that utilizes natural circulation as an auxiliary cooling mechanism.

It is a particular object of this invention to provide a heat exchanger utilizing natural circulation as an auxiliary cooling mechanism capable of cooling a nuclear reactor.

It is a more particular object of this invention to provide a heat exchanger with a cooling coil disposed about vertical heat transfer tubes and in a downward flow of coolant that utilizes natural circulation as an auxiliary cooling mechanism capable of cooling a nuclear reactor.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

In many nuclear steam supply systems well known in the art, a heat exchanger is disposed between the primary and secondary loops of the system thereby constituting a thermal interconnection between the primary and secondary loops while maintaining a physical barrier between the primary and secondary coolants. The invention described herein is such a heat exchanger having an auxiliary cooling mechanism that may be operated when the primary or secondary cooling mechanism is not operable.

Figure 1:
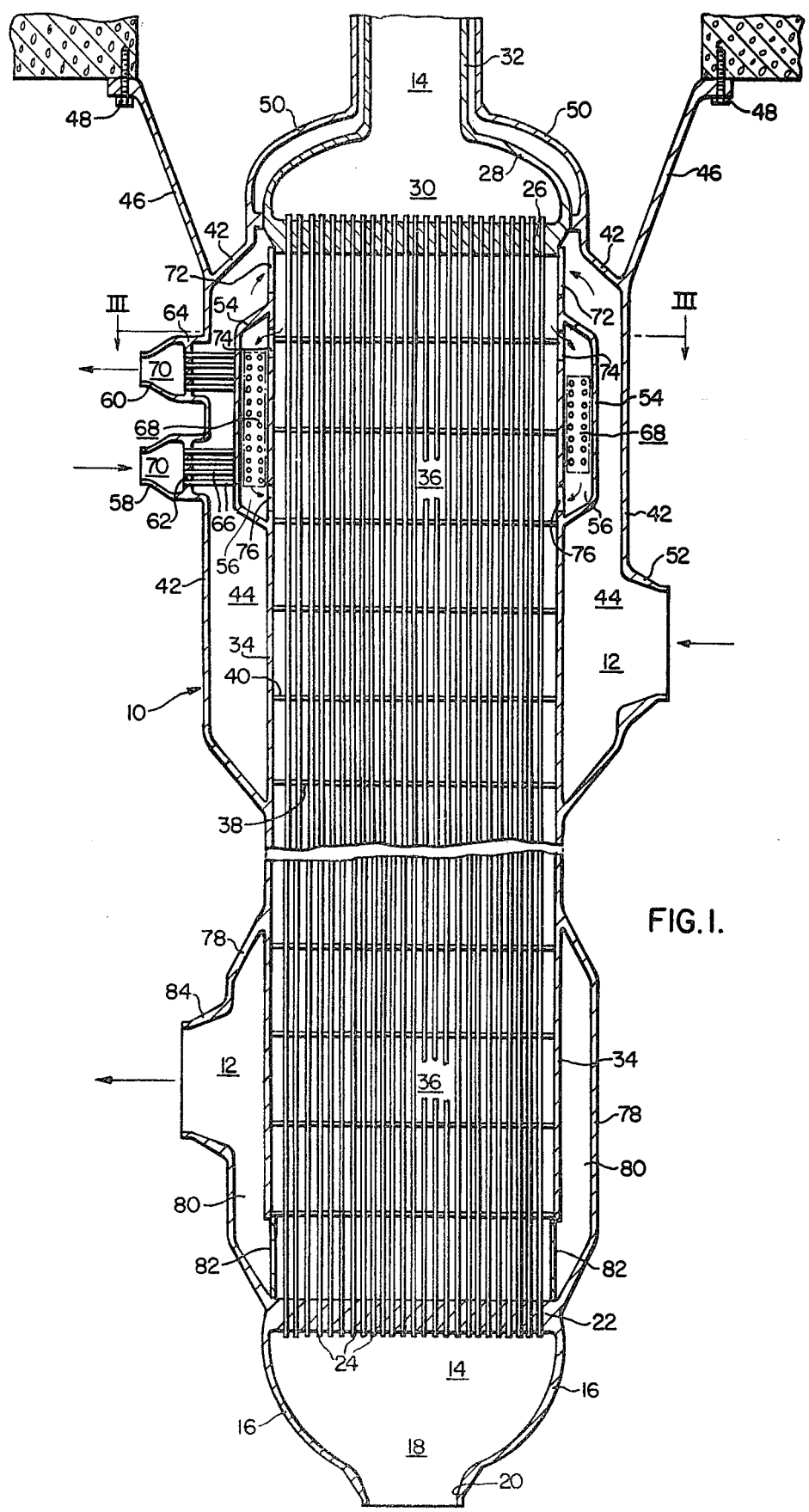
FIG. 1 is a cross-sectional view in elevation of a heat exchanger.

Referring to FIG. 1, a heat exchanger referred to generally as 10 is disposed between the primary and secondary loops of a nuclear steam supply system. The primary loop (not shown) conducts a primary coolant 12, which in a fast breeder reactor may be liquid sodium, from the reactor vessel where primary coolant 12 is heated thereby cooling the reactor vessel through a piping network to the heat exchanger 10 and back to the reactor vessel. The secondary loop (not shown) conducts a secondary coolant 14, which in a fast breeder reactor may be liquid sodium, from heat exchanger 10 where secondary coolant 14 absorbs heat from primary coolant 12 through a piping network to a steam generator (not shown) where steam is produced in a manner well understood by those skilled in the art and back to heat exchanger 10. Heat exchanger 10 serves to physically isolate primary coolant 12 from secondary coolant 14 while providing a thermal connection therebetween which allows heat to be transferred from primary coolant 12 to secondary coolant 14.

Still referring to FIG. 1, heat exchanger 10 has a substantially hemispherical lower shell 16 that defines a secondary inlet plenum 18. A secondary inlet nozzle 20 is attached to lower shell 16 and allows fluid communication by secondary coolant 14 between inlet plenum 18 and the remainder of the secondary loop. A circular lower tube sheet 22 is attached to the upper end of the lower shell 16 and has holes therein for accommodating heat transfer tubes 24. Heat transfer tubes 24 are hollow cylindrical metal tubes that are disposed vertically within heat exchanger 10 and extend through lower tube sheet 22 so as to be in fluid communication with inlet plenum 18. At their upper ends heat transfer tubes 24 extend through and are supported by a circular upper tube sheet 26. A substantially hemispherical upper shell 28 is attached to upper tube sheet 26 and defines, within it, outlet plenum 30. A secondary outlet nozzle 32 is attached to upper shell 28 and allows fluid communication between secondary outlet plenum 30 and the secondary loop for secondary coolant 14. A cylindrical metal housing 34 is attached at its top end to upper tube sheet 26 and at its lower end to lower tube sheet 22 thereby enclosing heat transfer tubes 24 and defining on its inner side an inner annulus 36. Tube supports 38 and baffles 40 are disposed in inner annulus 36 to support heat transfer tubes 24 and to enhance mixing of the primary coolant 12. Secondary coolant 14 flows through secondary inlet nozzle 20 into inlet plenum 18. From inlet plenum 18, secondary coolant 14 enters the lower ends of heat transfer tubes 24, flows through heat transfer tubes 24, into outlet plenum 30. From outlet plenum 30, secondary coolant 14 flows through secondary outlet nozzle 32 into the remainder of the secondary loop.

Figure 2:
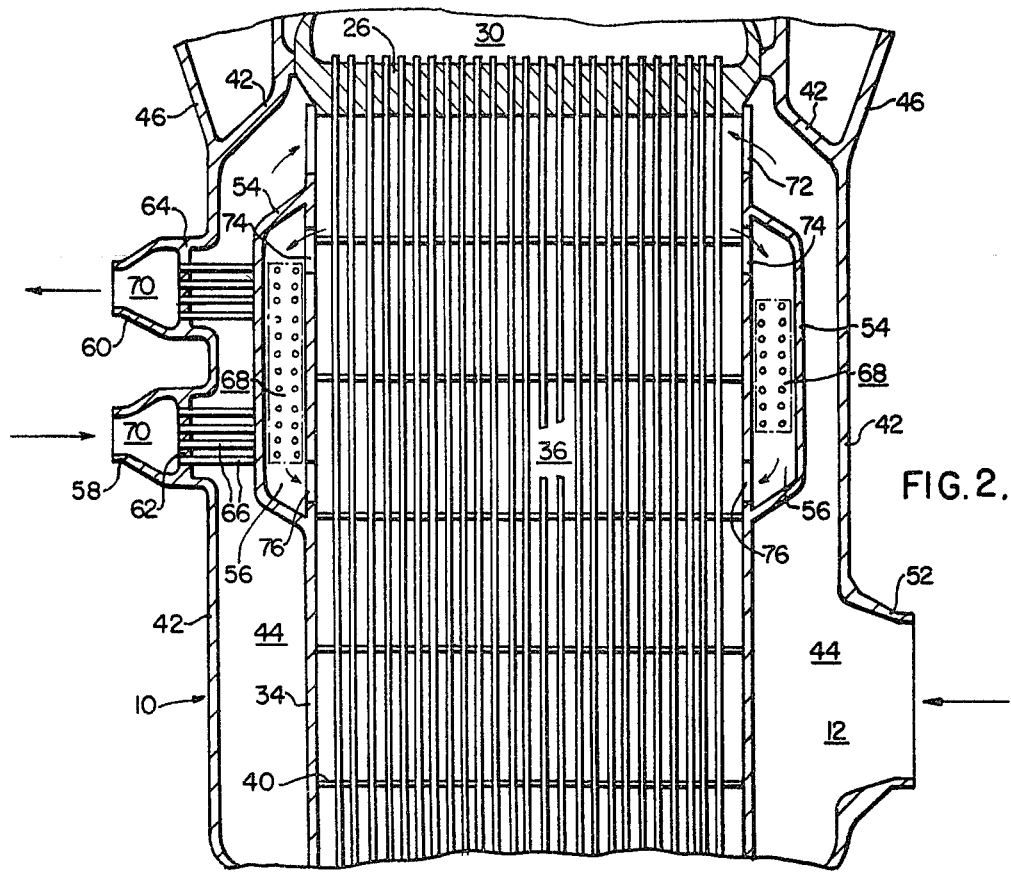
FIG. 2 is a partial cross-sectional view in elevation of the top portion of the heat exchanger shown in FIG. 1.
Figure 3:
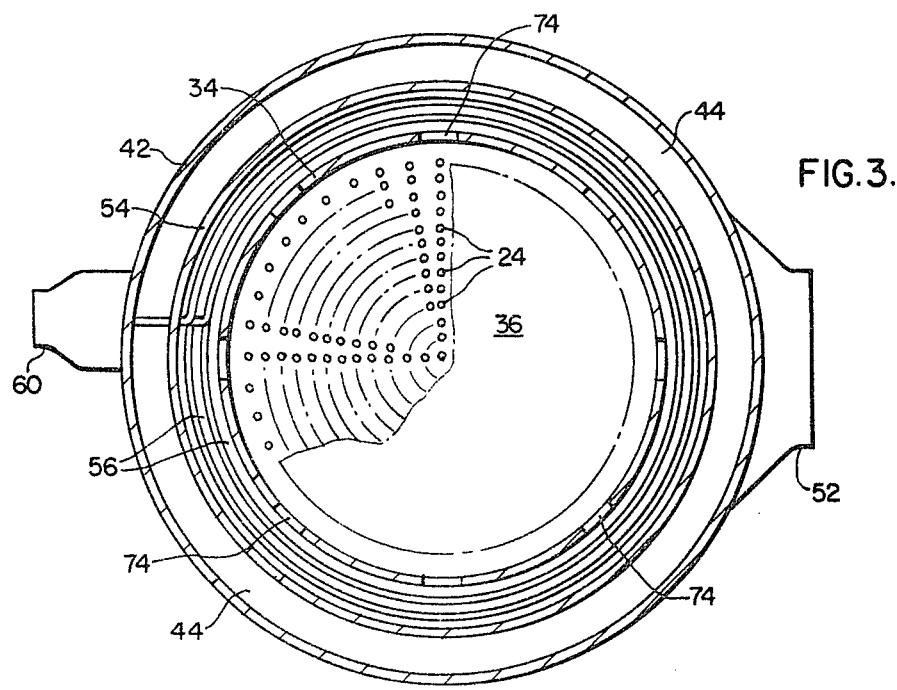
FIG. 3 is a view taken along line III-III of FIG. 2.

Referring now to FIGS. 1 and 2, a substantially cylindrical metal upper shroud 42 is disposed around the upper portion of housing 34 and is attached near its upper end to upper tube sheet 26 and near its lower end to housing 34. Upper shroud 42 together with housing 34 define therebetween an inlet annulus 44. A substantially conical metal support 46 is attached near the top of upper shroud 42 and is capable of supporting the entire heat exchanger 10 from a hanging position by having support 46 attached to a supporting structure such as a concrete containment by suitable means such as bolts 48. A casing 50 conforming to upper shell 28 is attached to the top of upper shroud 42 so as to house upper shell 28. Upper shroud 42 also has primary inlet nozzle 52 attached to one side thereof that accepts primary coolant that has been circulated through the reactor vessel. A substantially cylindrical inner shell 54 is disposed around the upper portion of housing 34 and inside upper shroud 42 defining a coil annulus 56 between inner shell 54 and housing 34. Upper shroud 42 also has a third coolant inlet nozzle 58 and third coolant outlet nozzle 60 disposed on the outside thereof. Third coolant inlet nozzle 58 has an inlet tube sheet 62 that separates inlet annulus 44 from the inside of third coolant outlet nozzle 58. Likewise, third coolant outlet nozzle 60 has an outlet tube sheet 64 that separates inlet annulus 44 from the inside of outlet nozzle 60. A multiplicity of stainless steel cooling tubes 66 extend through inlet tube sheet 62, across inlet annulus 44, through inner shell 54 and into coil annulus 56. Cooling tubes 66 are wound through coil annulus 56 so as to form a cooling coil 68 which is disposed in coil annulus 56. Near the top of cooling coil 68, cooling tubes 66 again extend through inner shell 54, across inlet annulus 44, and through outlet tube sheet 64. Cooling tubes 66, therefore, place the inside of third coolant inlet nozzle 58 in fluid communication with the inside of third coolant outlet nozzle 60 by means of cooling coil 68. A third coolant 70 which may be liquid sodium or a mixture of liquid sodium and potassium may be circulated through cooling coil 68 by entering third coolant inlet nozzle 58, flowing through cooling tubes 66, and out into third coolant outlet nozzle 60. Third coolant outlet nozzle 60 is connected to piping (not shown) which conducts the third coolant 70 to a cooling mechanism such as an air blast cooler that removes heat from the third coolant 70. The third coolant 70 may be pumped through this third coolant loop by an electromagnetic pump or other suitable pumping mechanisms.

First openings 72 are provided at regular intervals around the circumference of housing 34 near the top thereof that allow fluid communication between inlet annulus 44 and inner annulus 36. Second openings 74 are provided at regular intervals around the circumference of housing 34 below the upper attachment of inner shell 54 to housing 34 and above cooling coil 68 thereby allowing fluid communication between coil annulus 56 and inner annulus 36. In addition, third openings 76 are similarly provided in housing 34 below cooling coil 68 and above the lower attachment of inner shell 54 to housing 34 which allows fluid communication between coil annulus 56 and inner annulus 36. First openings 72, second openings 74, and third openings 76 allow primary coolant 12 to pass through inlet annulus 44, inner annulus 36, and coil annulus 56 in heat transfer relationship with heat transfer tubes 24 and cooling coil 68.

Referring again to FIG. 1, a metal lower shroud 78 is disposed around the lower portion of housing 34 with its upper end attached to housing 34 and its lower end attached to lower tube sheet 22. Lower shroud 78 together with the lower portion of housing 34 define therebetween and outlet annulus 80 that is in fluid communication with inner annulus 36 by means of fourth openings 82 which are provided at regular intervals around the circumference of housing 34 near the bottom thereof. In addition, a primary outlet nozzle 84 is attached to lower shroud 78. The primary coolant 12 having passed through the reactor vessel and having absorbed heat therefrom is conducted through the primary loop piping network to primary inlet nozzle 52. From primary inlet nozzle 52, the primary coolant 12 passes through inlet annulus 44 and up to first openings 72. Primary coolant 12 then passes through first openings 72 down through inner annulus 36 where it may pass through coil annulus 56 and eventually pass through fourth openings 82 into outlet annulus 80. While passing through inner annulus 36, primary coolant 12 passes in heat transfer relationship with heat transfer tubes 24, and while passing through coil annulus 56 primary coolant 12 passes in heat transfer relationship with cooling coil 68. From outlet annulus 80, primary coolant 12 exits heat exchanger 10 through primary outlet nozzle 84 and enters the remainder of the primary loop piping system which conducts primary coolant 12 back to the reactor vessel.

OPERATION

In general, the primary coolant 12 is circulated through the reactor vessel where heat is transferred from the fuel assemblies to the primary coolant thereby heating the primary coolant and cooling the reactor. The primary coolant is then pumped through a piping network by pumps well known in the art to the heat exchanger 10 where the primary coolant 12 passes in heat transfer relationship with secondary coolant 14 thereby transferring heat from primary coolant 12 to secondary coolant 14. Secondary coolant 14 is then circulated through the remainder of the secondary loop to a steam generator where steam is generated by methods well understood by those skilled in the art.

When passing through heat exchanger 10, secondary coolant 14 enters inlet plenum 18 through secondary inlet nozzle 20. From inlet plenum 18 secondary coolant 14 enters heat transfer tubes 24 and flows upwardly through heat transfer tubes 24 into outlet plenum 30. From outlet plenum 30, secondary coolant 14 exits heat exchanger 10 through secondary outlet nozzle 32. At the same time primary coolant 12 enters heat exchanger 10 through primary inlet nozzle 52 and flows into inlet annulus 44. Primary coolant 12 flows upwardly through inlet annulus 44 and around housing 34 until it enters inner annulus 36 through first openings 72. While in inner annulus 36 the primary coolant 12 which because it has recently passed through the reactor vessel is very hot passes in heat transfer relationship with heat transfer tubes 24 which conduct secondary coolant 14 therethrough. In this manner, heat is transferred from primary coolant 12 to secondary coolant 14. Supports 38 and baffles 40 enhance this heat transfer by mixing the flow of primary coolant 12. The primary coolant 12 proceeds downwardly through inner annulus 36 and flows through fourth openings 82 into outlet annulus 80 where it exits heat exchanger 10 through primary outlet nozzle 84. While passing down inner annulus 36, primary coolant 12 may be diverted by pressure, or thermal differences, or by turbulent flow through coil annulus 56. In this case, primary coolant 12 enters coil annulus 56 through second openings 74 passes down through coil annulus 56 in heat transfer relationship with cooling coil 68, and back into inner annulus 36 through third openings 76. Under normal conditions there is no fluid being circulated through cooling coil 68 so that little heat transfer occurs in coil annulus 56. However, should the mechanisms that are used to pump the primary and secondary coolants such as coolant pumps, become inoperable due to mechanical failure, power interruption, or other reasons, which would result in minimal flow of primary coolant 12 through the reactor vessel and could result in overheating of the reactor vessel; an auxiliary pump (not shown) which may be an electromagnetic pump may be activated to pump a third coolant 70 which is relatively cooler than primary coolant 12 through third coolant inlet nozzle 58 and into cooling tubes 66. Third coolant 70 is thus pumped through cooling coil 68 where it passes in heat transfer relationship with primary coolant 12, thereby transferring heat from primary coolant 12 to third coolant 70. Third coolant 70 then proceeds to be pumped through the third loop where it passes through a cooling mechanism such as an air blast cooler where heat is removed and the third coolant 70 is returned through the third loop to cooling coil 68. Under these conditions the primary coolant 12 in coil annulus 56 is cooled which causes primary coolant 12 to increase its flow downwardly through coil annulus 56 where it is further cooled. As the cooler primary coolant 12 flows downwardly through coil annulus 56, the hotter primary coolant 12 in inner annulus 36 is induced through second openings 74 into coil annulus 56 where it too is cooled. This cooling of primary coolant 12 establishes a natural thermal circulation of primary coolant 12 into second openings 74, through coil annulus 56 and out third openings 76. Once through third openings 76 and back into inner annulus 36, the primary coolant 12 having passed through coil annulus 56 and thus being cooler than the remainder of the primary coolant 12 not having passed through coil annulus 56, continues to flow downwardly through inner annulus 36. The primary coolant 12 flowing downwardly through inner annulus 36 due to natural circulation continues to flow throughout the entire primary loop. Thus the natural thermal circulation of primary coolant 12 through coil annulus 56 establishes a natural circulatory flow through the entire primary loop which allows the reactor to be cooled by transferring heat from primary coolant 12 to third coolant 70 even though the primary coolant pumps may not be operable. Therefore, the invention provides a heat exchanger with a cooling coil disposed about vertical heat transfer tubes and in a downward flow of coolant that utilizes natural circulation as an auxiliary cooling mechanism which is capable of cooling a nuclear reactor.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, cooling coil 68 may be replaced with a U-tube array that would extend from inlet tube sheet 62, through housing 34, down inner annulus 36, and back up to outlet tube sheet 64.

I claim as my invention:

1. A heat exchanger comprising:
   vertically arranged first heat transfer tubes;
   a secondary coolant flowing through said first heat transfer tubes;
   a housing surrounding said first heat transfer tubes and having first openings near the top thereof;
   a shroud surrounding the upper portion of said housing;
   a primary coolant flowing upwardly through said shroud, through said first openings, and downwardly within said housing passing in heat transfer relationship with said first heat transfer tubes; and
   an auxiliary cooling means disposed in fluid communication with the downward flow of said primary coolant for cooling said primary coolant thereby increasing the natural circulation of said primary coolant.

2. The heat exchanger according to claim 1 wherein said auxiliary cooling means comprises:
   an inner shell attached to the outside of said housing and enclosed within said shroud, said inner shell and said housing defining an annulus therebetween, said annulus being in fluid communication with the inside of said housing;
   a cooling coil disposed in said annulus in heat transfer relationship with said primary coolant; and
   a third coolant flowing through said cooling coil at a temperature less than that of said primary coolant for transferring heat from said primary coolant to said third coolant thereby increasing the natural circulation of said primary coolant.

* * * * *